United States Patent Office 2,969,393
Patented Jan. 24, 1961

2,969,393
CONVERSION OF NITROCYCLOHEXANE TO N-CYCLOHEXYLHYDROXYLAMINE

George G. Joris, Madison, N.J., assignor to Allied Chemical Corporation, a corporation of New York No Drawing. Filed Nov. 19, 1953, Ser. No. 393,235

2 Claims. (Cl. 260—563)

This invention relates to production of N-cyclohexylhydroxylamine. More particularly it relates to production of this compound from liquid nitrocyclohexane, which can be in a crude form admixed with cyclohexane, with a minimum of processing operations and under readily procured operating conditions including pressures which can be about atmospheric.

I have found that the reaction of liquid nitrocyclohexane with hydrogen can be directed to afford high yields of N-cyclohexylhydroxylamine by employing specifically a palladium-containing hydrogenation catalyst to activate the hydrogen and maintaining in the catalyst zone temperatures not above about 60° C.; withdrawing the reaction mixture as a homogeneous solution from the catalyst zone when part of the nitrocyclohexane in the reaction mixture has been reduced by reaction with hydrogen while part of said nitrocyclohexane remains unreacted; and removing, externally of the catalyst zone, N-cyclohexylhydroxylamine from solution in the reaction mixture, which is then recycled for further conversion of its nitrocyclohexane content to N-cyclohexylhydroxylamine.

The palladium-containing hydrogenation catalyst employed in my process is preferably distributed upon a carrier material, e.g. in a fixed bed through which the liquid nitrocyclohexane and the hydrogen are flowed. The results obtained in terms of reaction rates and yields of N-cyclohexylhydroxylamine as against by-products vary rather considerably with the choice of catalyst carrier. I have found that alumina and calcium carbonate are among carrier materials which give excellent results. The results depend to some extent upon the concentration of catalyst deposited upon the carrier; relatively low concentrations such as about 0.1–10% can be used with good results.

Temperatures throughout the reaction zone are maintained in my process at values not above about 60° C., to keep down the production of by-products (chiefly cyclohexylamine). Temperatures of about 40° C. give very good results. Lower temperatures such as 30° C. are operative but temperatures should be high enough so that the reaction mixture is in the form of a homogeneous solution. If solids precipitate, they interfere with contact between reactants and catalyst.

A variety of expedients can be used in accordance with my process to remove N-cyclohexylhydroxylamine from solution in the effluent reaction mixture. Preferably the removal will maintain the N-cyclohexylhydroxylamine content of the solution recycled to the catalyst zone at not above an average of 0.5 gram per 100 cc. of recycled solution entering the catalyst zone.

One method, which has the advantage of being suitable for continuous operation, is to supply in the reaction zone a solvent miscible with nitrocyclohexane, in which N-cyclohexylhydroxylamine is less soluble than in nitrocyclohexane. The homogeneous liquid reaction mixture containing N-cyclohexylhydroxylamine in solution, unreacted nitrocyclohexane, and additional solvent is withdrawn from the catalyst zone and is cooled to a temperature at which solid N-cyclohexylhydroxylamine crystallizes therefrom. Preferably the cooling is to a temperature at which the N-cyclohexylhydroxylamine saturation concentration in the mother liquor does not exceed 0.5 gram per 100 cc. of solution; thus only a small proportion of the total N-cyclohexylhydroxylamine formed is repeatedly exposed to reduction upon recycle of the mother liquors. The mother liquors are then recycled and the operation can be carried on continuously. A suitable solvent for use in such operations is cyclohexane.

Another method is to contact the effluent externally of the reaction zone with a solvent for N-cyclohexylhydroxylamine which is immiscible with nitrocyclohexane. This solvent extracts N-cyclohexylhydroxylamine from its solution in nitrocyclohexane. For example in recycling operations, the reaction mixture containing N-cyclohexylhydroxylamine and nitrocyclohexane can be withdrawn from the catalyst zone and contacted with dilute aqueous mineral acid, such as 10–20% sulfuric or hydrochloric acid, which extracts practically all of the N-cyclohexylhydroxylamine. The nitrocyclohexane phase which separates from the dilute acid phase is then recycled.

It is not always necessary in accordance with my process to recover N-cyclohexylhydroxylamine from the reaction mixture, even though the mixture is to be recycled to the reduction operation. Thus N-cyclohexylhydroxylamine can be removed from solution in reaction mixture withdrawn from the catalyst zone by subjecting the effluent to oxidizing conditions to convert N-cyclohexylhydroxylamine therein to cyclohexanone oxime. This oxime, I have found, is stable under the conditions of reduction employed in my process, so that the resulting solution of oxime and unreacted nitrocyclohexane can be recycled to the hydrogenation catalyst for further steps of reducing nitrocyclohexanes to N-cyclohexylhydroxylamine and oxidizing this product to cyclohexanone oxime.

In my process generally I employ hydrogen at about atmospheric pressures. Higher and lower pressures can be used but offer no particular advantages; and at higher pressures the reaction time and temperature may be difficult to control within the ranges giving high yields of N-cyclohexylhydroxylamine.

Use of an inert solvent miscible with nitrocyclohexane is helpful in my process for maintaining the desired control of reaction time and temperature and facilitating flow of the normally viscous nitrocyclohexane. In addition to cyclohexane above cited, methanol is exemplary of suitable solvents. Concentrations of nitrocyclohexane in the solvent are suitably in the range between about 10% and about 50% volume by volume e.g. 10–20% in cyclohexane. In 10–20% volume by volume nitrocyclohexane-in-cyclohexane solutions, the solubility of N-cyclohexylhydroxylamine in grams per 100 cc. of solution goes from about 0.07 gram at 10° C. to about 0.5 gram at 50° C.

The following examples are illustrative of my process, but my process is not to be interpreted as limited to the precise details of the examples.

*Example 1.*—The method of operation was to pass nitrocyclohexane in solution downward through the catalyst bed and to pass hydrogen up through the bed. The effluent homogeneous solution was cooled to a temperature at which substantially all the cyclohexylhydroxylamine contained therein crystallized out, and was then filtered. The mother liquors were recycled to the catalyst bed.

A vertical column consisting of a ¾″ i.d. Pyrex tube constituted the catalyst chamber. It was connected through a ground glass joint to a receiver which was refrigerated. The solution collected in the receiver was continuously drawn through a filter and heater and pumped with an automatic pipeting machine back to the top of the column. Hydrogen was introduced at the bottom of the catalyst chamber through a side connection; its rate of introduction was such that a positive pressure was maintained in the apparatus as indicated by a bubbler inserted in the exit gas flow.

The catalyst bed had a volume of 60 cc. and was made up of 40 grams of a commercially available 0.5% by weight palladium on alumina pelleted catalyst of 8 mesh. The temperature of the catalyst bed was maintained not above about 40° C. at the hottest spot.

The start-up feed was a solution of 13 grams of nitrocyclohexane in 130 cc. cyclohexane solvent.

N-cyclohexylhydroxylamine was recovered from the effluent reaction mixture by cooling in the receiving vessel to 5° C., with a residence time therein of about 10 minutes; and filtering. The mother liquors were recycled at a rate of 300 cc. per hour. The N-cyclohexylhydroxylamine thus recovered after 6 hours of operation amounted to 7.5 grams. The N-cyclohexylhydroxylamine remaining in the mother liquor amounted to 0.1% by weight. The nitrocyclohexane consumed amounted to 10.3 grams. The nitrocyclohexane remaining in the mother liquors after separation of N-cyclohexylhydroxylamine amounted to 2.7 grams as determined by infra red analysis of the mother liquors. The yield of N-cyclohexylhydroxylamine was accordingly about 82% of theory based on nitrocyclohexane consumed.

*Example 2.*—The apparatus and procedure were the same as used in Example 1 except for details noted below. The catalyst bed had a volume of 75 cc. and was made up of 50 grams of a commercially available 0.5 percent by weight palladium on alumina pelleted catalyst of 8 mesh. The temperature of the catalyst bed was maintained at or below 40° C. at the hottest spot.

The start-up feed was a solution of 27 grams of nitrocyclohexane and 0.7 gram of cyclohexylamine in 250 cc. of cyclohexane solvent. The rate of flow of the recycled feed was 300 cc. per hour.

N-cyclohexylhydroxylamine was continuously recovered from the effluent mixture by cooling to 5° C. and filtering. The cyclohexylhydroxylamine recovered after 6.5 hours of operation amounted to 8.5 grams; 10 grams of nitrocyclohexane were consumed. The yield of N-cyclohexylhydroxylamine was therefore 95 percent of theory. A total of 0.7 gram of cyclohexylamine was made as a by-product.

*Example 3.*—In another experiment using the apparatus and procedure described in Example 1, the catalyst bed had a volume of 100 cc. and was made up of a commercially available 1.0 percent by weight palladium on calcium carbonate pelleted catalyst of 8 mesh. The temperature of the catalyst bed was maintained at 40° C.

The start-up feed was a solution of 20 percent by weight of nitrocyclohexane in cyclohexane solvent. The rate of flow of the recycle feed was 300 cc. per hour. N-cyclohexylhydroxylamine was recovered from the effluent reaction mixture by cooling to 5° C. and filtering. The N-cyclohexylhydroxylamine recovered per hour was 1.46 grams, representing a conversion of 78 percent of theory based on the nitrocyclohexane consumed.

*Example 4.*—The procedure was the same as in the above examples except that the reaction mixture leaving the reactor was continuously extracted by passage through a column charged with 40 cc. of a 10 percent solution of hydrochloric acid kept at room temperature, in lieu of cooling and filtering the reaction mixture.

The start-up feed was a solution of 25 grams of nitrocyclohexane in 150 cc. of cyclohexane. The catalyst bed had a volume of 60 cc. and was made up of 40 grams of a commercially available 0.5 percent by weight palladium on alumina pelleted catalyst of 8 mesh.

The rate of flow of the recycled feed was 300 cc. per hour. The catalyst was maintained at 40° C. and the run lasted 5 hours. At the end of the run the recycled liquor was analyzed for cyclohexylhydroxylamine and nitrocyclohexane. It was found that it contained 0.5 gram of cyclohexylhydroxylamine and 18.5 grams of nitrocyclohexane. The hydrochloric acid solution was neutralized with 10 percent aqueous ammonia; 5.3 grams of cyclohexylhydroxylamine crystals were separated. Thus a total of 5.8 grams of cyclohexylhydroxylamine were produced from 6.5 grams of nitrocyclohexane consumed, the yield being therefore practically theoretical.

*Example 5.*—In another typical experiment using apparatus and procedure as in Example 1, except as noted below, a start-up solution of 16 grams of nitrocyclohexane in 160 cc. of methanol was flowed through a catalyst bed consisting of 45 grams (67.5 cc.) of a 2.2 percent by weight of palladium on alumina commercially available catalyst; as in the above experiment hydrogen was fed at the bottom of the catalyst bed. The catalyst was maintained at 30° C. The homogeneous solution leaving the reduction catalyst bed was then fed into the top of another reactor tube containing 200 grams of a copper chromite catalyst maintained at 50° C., and through which oxygen was flowed countercurrently. The solution leaving the oxidation catalyst bed was continuously recycled into the top of the reduction catalyst bed at a circulation rate of 300 cc. per hour.

The run lasted 8 hours. At the end of the run, the reaction mixture was analyzed. It contained 7.5 grams of cyclohexanone oxime and 1.9 grams of cyclohexylamine; 11.2 grams of nitrocyclohexane were consumed. The yield of cyclohexanone oxime from nitrocyclohexane was thus 76 percent of theoretical.

I claim:
1. The process for producing cyclohexylhydroxylamine which comprises contacting a cyclohexane solution of nitrocyclohexane with at least one molecular proportion of hydrogen in the presence of a palladium catalyst at a temperature below that at which excessive production of cyclohexylamine occurs and removing the cyclohexylhydroxylamine so formed from the reaction mixture.

2. Process for producing N-cyclohexylhydroxylamine which comprises contacting, at temperatures throughout the reaction zone of about 40° C., nitrocyclohexane in liquid phase with hydrogen activated by a supported palladium catalyst said catalyst being 0.1–5% by weight of palladium supported on a carrier, the hydrogen pressure being about atmospheric, and cyclohexane amounting to about 80–90% by volume of the fresh feed being supplied in the reaction zone; withdrawing as a homogeneous solution from the catalyst zone, reaction mixture in which part of said nitrocyclohexane has been reduced to N-cyclohexylhydroxylamine and part of said nitrocyclohexane remains unreacted; removing, externally of the catalyst zone, N-cyclohexylhydroxylamine from solution in said reaction mixture; and recycling the reaction mixture thus obtained to the catalyst zone, not more than 0.5 gram of N-cyclohexylhydroxylamine, on the average, being present in 100 cc. of reaction mixture being recycled into the catalyst zone.

References Cited in the file of this patent
UNITED STATES PATENTS

| | | |
|---|---|---|
| 2,420,382 | Robertson | May 13, 1947 |
| 2,423,180 | Doumani et al. | July 1, 1947 |
| 2,886,596 | Meister et al. | May 12, 1959 |

OTHER REFERENCES

Wallach et al.: "Liebigs Annalen," vol. 279 (1894), pages 367–69.

Harries et al.: "Ber. Deut. Chem., vol. 31 (1898), pages 1379–83 and pages 1810–11.

Harries et al.: "Ber. Deut. Chem. vol. 32 (1899), pages 1348–49.

Grammaticakis: "Comptes. Rendus," vol. 224 (1947), pages 1066–68.